May 23, 1972 E. W. TREFZGER ET AL 3,664,607

DUAL TAKE-UP REEL

Filed March 23, 1970

INVENTORS.
BRUCE R. CRIMMINS
EDWIN W. TREFZGER

BY

George W. Killion

AGENT 3,664,607

DUAL TAKE-UP REEL

Edwin W. Trefzger, Ilion, and Bruce Crimmins, Little Falls, N.Y., assignors to The Singer Company Filed Mar. 23, 1970, Ser. No. 21,565
Int. Cl. G11b *15/66*; B65h *75/28*
U.S. Cl. 242—195 3 Claims

ABSTRACT OF THE DISCLOSURE

A take-up reel having inner and outer concentric hubs for the temporary storage of tape, such as magnetic tape, from a supply reel is disclosed. Typically the tape will include a leader tape associated with both the take-up reel and the supply reel with the tapes coupled together by means of a leader hook. The leader tape of the take-up reel is wound on the inner hub of the take-up reel while the leader tape of the supply reel and the information bearing tape from the supply reel are wound on the outer hub of the take-up reel. The inner and outer hubs are arranged for coaxial but independent rotation. The outer hub has a cutaway portion which provides an aperture into which the leader hook coupling the leader tape of the take-up reel and the leader tape of the supply reel is lodged. When the leader hook is lodged in the aperture, the inner and outer hubs are coupled together for coincident rotation. Since the leader hook is lodged in the aperture, the information bearing tape from the supply reel, which is wound on the outer hub of the take-up reel, is not stretched nor distorted as it is wound on the outer hub of the take-up reel. Driving power for turning the take-up reel is applied to the inner hub. When the leader hook is lodged in the aperture, the inner and outer hubs are coupled together so that the inner and outer hubs rotate at the same angular velocity. In a similar manner when the tape is being rewound on the supply reel, the leader hook maintains the coupling between the inner and outer hubs of the take-up reel thereby maintaining their rotation at the same angular velocity. However, as soon as the leader hook is withdrawn from the aperture, the outer hub ceases to rotate and only the inner hub is rotated.

BACKGROUND OF THE INVENTION

Tape transport systems are old and well known in the art. When such systems were originally developed, it was necessary to extract a length of tape from the supply reel and manually thread it through the reading and/or writing stations and attach it by some appropriate means to the take-up reel. In certain applications it was desirable to eliminate the hand threading of the tape between the supply and take-up reels. Accordingly, techniques were developed for automatic threading from the supply reel to the take-up reel. In a typical application there was a piece of leader tape permanently associated with the take-up reel and which was threaded through the tape deck to a position near the supply reel. The supply reel typically had a piece of leader tape and coupled to the leading end thereof was a connector which could be simply and quickly connected to the trailing end of the leader tape of the take-up reel. A wide variety of coupling techniques have been developed. A new and improved type of coupling between the supply and take-up reels is disclosed in the copending application of Crimmins and Trefzger filed on Mar. 23, 1970 and assigned Ser. No. 21,564. In some prior art devices, and in the cited copending application, there is disclosed a means for coupling the two leader tapes which involves no manual manipulation other than to place the supply reel in its appropriate position on the tape deck. Typically, the leader hook for coupling the two leader tapes has an appreciable thickness and therefore, when the take-up reel is rotated to draw tape from the supply reel and wind it on the take-up reel, the leader hook makes a bump on the hub of the take-up reel around which all of the tape from the supply reel is wound. This bump, or bump, on the hub of the take-up reel tends to stretch, damage and/or distort the tape from the supply reel—a situation which can weaken the tape and/or possibly elongate the tape in that section, thereby causing a potential error in the reading of any data recorded on the tape in that section. Some prior art devices employed a take-up reel having a circumference at the hub at least equal to the length of the leader tape associated with the supply reel and having a recess in the circumference of the hub for accommodating the leader hook coupling the supply and take-up tapes. This technique served admirably but had the disadvantage of requiring an inordinately large take-up reel and a precisely measured length of leader tape associated with the take-up reel. Accordingly, it is an object of this invention to provide a new and improved tape transport system which overcomes the disadvantages of prior art systems.

It is a more specific object of this invention to provide a new and improved unique take-up reel.

It is another object of this invention to provide a new and improved take-up reel having a recess for accommodating the leader hook.

It is a more specific object of this invention to provide a take-up reel comprising first and second concentric hubs.

It is an even more specific object of this invention to provide a take-up reel having first and second concentric hubs which are selectively coupled together for coincident rotation by the leader hook which couples the leader tapes associated with the take-up reel and the supply reel, respectively.

It is another object of this invention to provide a take-up reel onto which tape can be wound from a supply reel without distorting the tape by winding it over a bump created by the leader hook coupling the supply tape to the take-up reel.

It is another object of the invention to provide a take-up reel whose cricumference is not required to bear any fixed relationship to the length of the leader tape associated therewith.

SUMMARY OF THE INVENTION

The invention comprises a take-up reel having first and second concentric hubs with drive means for rotating the inner hub independent of the outer hub. The outer hub has a cutaway portion which, as will be seen, provides an aperture into which the leader hook coupling the leader tape of the take-up reel with the leader tape of the supply reel may be lodged. The size of the cutaway portion of the outer hub and the leader hook are so proportioned that when the leader hook is drawn into the aperture means provided by the cutaway portion, the inner and outer hubs are coupled together with the leader hook serving somewhat as a key for coupling the two hubs together. The dimensions of the hubs and the aperture together with the leader hook are so chosen that when the leader hook is engaged in the aperture any tape wrapped around the circumference of the outer hub does not encounter any projection or obstruction, which may damage or distort the tape.

The outer hub includes at least a lower flange which helps to guide and support the lower edge of the tape from the supply reel as it is wound on the take-up reel. The typical leader hook has a portion which is in a plane below the lower edge of the tape. In such cases, the flange of the take-up reel must have a dependent portion which is also lower than the plane of the tape. It will be recalled that as the leader tape of the take-up reel is wound on the inner hub, the outer hub does not rotate. Furthermore, the outer hub is at a relatively fixed angular position during the time that the leader tape is wound on the inner hub. Accordingly, only a relatively small portion of the flange of the outer hub needs to be depressed to allow for the passage of the leader hook.

As already indicated, the outer hub has a cutaway section which provides an aperture into which the leader hook may be lodged. The leader hook, when so lodged in the aperture, locks the inner and outer hubs together for coincident rotation thereof in response to the application of rotational driving power to the inner hub. In a similar manner the inner and outer hubs of the take-up reel remain locked together while tape is being withdrawn from the take-up reel and rewound on the supply reel in response to the application of rotational power to the hub of the supply reel.

BRIEF DESCRIPTION OF THE DRAWING

The drawing comprises four figures wherein.

Figure 1:
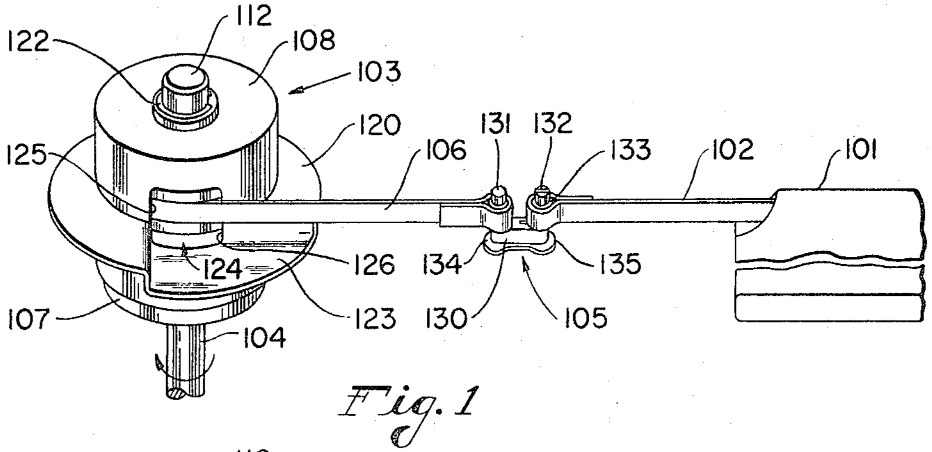
FIG. 1 illustrates the take-up reel, a supply reel and the leader hook connecting the tape between the take-up reel and the supply reel.

Referring now more particularly to the figures of the drawing, there will be seen in FIG. 1 a cassette 101 which serves as a supply of tape 102. The cassette 101 is more fully disclosed in the cited copending application. The tape 102 as it is withdrawn from the cassette 101 is wound on take-up reel 103. The cited copending application discloses some details of the tape drive mechanism for extracting the tape 102 from the cassette 101 and winding it on the take-up reel 103. However, since such tape transport mechanism does not form any part of the present invention and since such tape transport systems are well known and widely used, such tape transport system is not shown herein as it would only tend to add unnecessary detail to the drawing and specification and thereby obscure the inventive concept. As will be seen, the take-up reel 103 is mounted on, and turned by, shaft 104. When the tape 102 is to be returned to the cassette 101, a similar shaft (not shown) associated with cassette 101 is rotated in an appropriate direction to return the tape 102 to the cassette 101.

As more fully set forth in the cited copending application, the cassette 101 is designed to be placed in position on a tape deck and in the act of so positioning said cassette, couple the tape 102 contained therein to a leader hook 105 which is permanently associated with a piece of leader tape 106 which has its other end permanently coupled to the take-up reel 103. Accordingly, it is not necessary to manually extract any of the tape 102 from cassette 101 and thread it through the tape transport system and attach it to the take-up reel 103. This concept of self-threading, as it is sometimes called, is not broadly new and is well known to those familiar with modern and sophisticated tape transport mechanisms. Such systems quite typically require a coupling element, such as, the leader hook 105, as shown in the present application for coupling the leader tape 106 associated with the take-up reel 103 with the supply tape 102 being extracted from the supply source, cassette 101. If no special provision is made, the leader hook 105 would be wound onto take-up reel 103 and produce a bump around which all the tape 102 would be wound. The bump would tend to stretch, distort and possibly break or damage the tape 102. The present invention is specifically directed to a technique for preventing the formation of a bump on the take-up reel 103 which might damage the tape 102 wound on the take-up reel 103. Accordingly, the construction of the take-up reel will now be explained in more detail.

Figure 2:
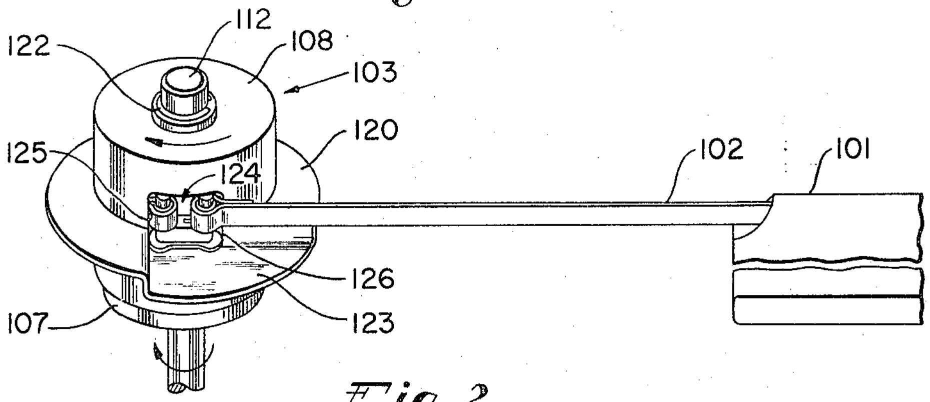
FIG. 2 shows the take-up reel with the leader hook lodged in the aperture of the outer hub of the take-up reel.
Figure 3:
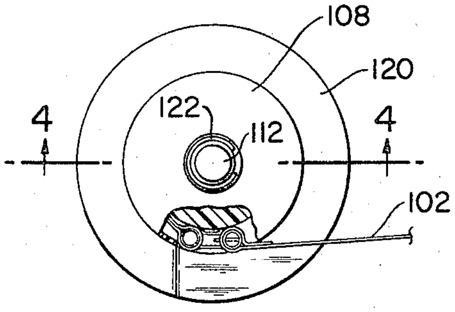
FIG. 3 shows a top view of the take-up reel with a portion of the outer hub cut away to show how the leader hook may be lodged in the aperture of the outer hub.
Figure 4:
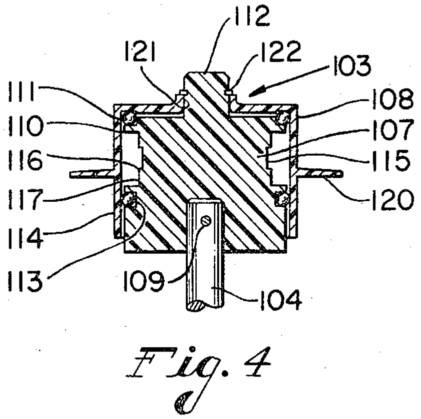
FIG. 4 is a cross-section view of the take-up reel taken along line 4—4 of FIG. 3.

Attention is now invited to FIG. 4 of the drawing which is a cross-sectional view of the take-up reel 103 taken along line 4—4 of FIG. 3. As may be seen, the take-up reel 103 comprises inner and outer hubs 107 and 108, respectively. The inner hub 107 is appropriately coupled to shaft 104 by some appropriate means such as pin 109. The inner hub 107 has an upper ledge 110 which supports a plurality of ball bearings 111 whose purpose will be explained hereinbelow. As may be seen, the inner hub also includes a boss 112 which, as may be seen in the other figures, helps to position and support the outer hub 108. The inner hub 107 also includes a raceway 113 which houses a second plurality of ball bearings 114. The inner hub 107 has a groove or channel 115 which has a height approximately equal to, but no narrower than, the width of a leader tape 106. The depth of the groove or channel 115 is sufficient to accommodate a few layers of leader tape 106. Any appropriate means (not shown) is provided for permanently attaching one end of the leader tape 106 to the inner hub 107. The outer hub 108 has a flange 120 which serves to support the lower edge of tape 102 as it is wound on the take-up reel 103. The outer hub 108 has a hollow interior which fits over the inner hub 107 and has appropriate surfaces for contacting the ball bearings 111 and 114 to permit a free and easy rotation of the inner hub 107 with respect to the outer hub 108. A hole 121 in the outer hub 108 accommodates the boss 112 of the inner hub 107. A C-ring 122 retains the outer hub 108 in its proper position with respect to the inner hub 107. It should be obvious that the assembly shown permits the rotation of shaft 104 and the corresponding rotation of inner hub 107 without the rotation of outer hub 108. As may be seen in FIGS. 1 and 2, the flange 120 of outer hub 108 has a depressed portion 123 which will provide a function to be described hereinafter. The outer hub 108 has an opening 124 in the area of the depressed portion 123 of flange 120.

Attention is now invited to the construction of the leader hook 105. Some of the details and function of the leader hook 105 are more fully described and explained in the cited copending application. For the purposes of explaining the present invention, it should be observed that the leader hook 105 has a base portion 130 and first and second upstanding projections 131 and 132. The leader tape 106 is permanently coupled by suitable means to upstanding projection 131 and preferably in such a manner that the tape 106 can pivot freely on projection 131 or so that projection 131 can pivot with respect to base portion 130. The leading end of tape 102 has associated therewith an eyelet 133 having a hole large enough to accommodate projection 132. The eyelet 133 is permanently associated with the tape 102 and is coupled to the projection 132 all in the manner more fully set forth in the cited copending application. With the leader tape 106 and the tape 102 coupled by means of leader hook 105 in the manner shown in FIG. 1 and with shaft 104 turning in the direction shown by the arrow, it is apparent that the inner hub 107 will rotate in the same direction and that the leader tape 106 will be wound around the inner hub 107 and more specifically, in the grove or channel 115. It should be observed that the lower edge 116 of the channel 115 is in approximately the same horizontal plane as the flange 120 of outer hub 108. The leader tape 106 passes through opening 124 of the outer hub 108 as it is being wound in the groove 115. The outer hub 108 is restrained from rotation with the inner hub 107 while the leader tape 106 is being wound on the inner hub 107 by contact with one or the other of the edges 125 and/or 126 of opening 124 with the tape 106. As may be seen, the depressed portion 123 of flange 120 allows the passage of base 130 of leader hook 105 towards the opening 124 as the tape 106 is wound on inner hub 107. With the continued rotation of shaft 104, the leader hook 105 is drawn closer and closer to the inner hub 107 until finally the leading edge 134 of leader hook 105 comes into contact with edge 125 of opening 124. The relative dimensions of the inner and outer hubs 107 and 108, respectively, and the space therebetween in the vicinity of groove 115 is such that there is insufficient room for the leader hook 105 to enter. However, the relative dimensions of leader hook 105, the opening 124, and the space between the inner and outer hubs 107 and 108 are such that the leader hook will fit into the opening 124 and have its base 130 in contact with part 117 of inner hub 107 and the leading edge 134 of leader hook 105 in contact with edge 125 of opening 124 while the trailing edge 135 of leader hook 105 is in contact with edge 126 of opening 124. Furthermore, these dimensions are so chosen that the parts of the leader hook 105 above the flange 120 will reside sufficiently within the opening 124 as to be contained within the outer circumference of the outer hub 108. Accordingly, the tape 102 may now be wound on the outer circumference of the outer hub 108 without encountering any significant discontinuity of such circumference which would tend to distort or damage the tape 102. When the leader hook 105 enters the opening 124 as above described, the contact between the leader hook 105 and the outer hub 108 will cause the rotation of the outer hub 108 in response to the continued rotation of the inner hub 107. More specifically, the leader hook 105, in effect, functions something like a key for coupling the inner and outer hubs 107 and 108, respectively, together for coincident rotation. From the foregoing discussion, it should be apparent that the depressed portion 123 of flange 120 is provided to accommodate the passage of the base portion 130 of leader hook 105 as the leader hook 105 is drawn towards the inner hub 107 in response to the rotation of shaft 104. In response to the continued rotation of shaft 104 and the rotation of inner hub 107 together with the outer hub 108 which is coupled to the inner hub 107 by the leader hook 105, the tape 102 will be wound on the outer hub 108 and the bottom edge of the tape 102 will be supported by flange 120.

The structure provided teaches a means of winding a length of leader tape 106 of indeterminate length on an inner hub 107 while the tape 102 is wound on an outer hub 108 and the leader hook 105 coupling the two tapes 106 and 102 is lodged in an opening 124 in such a manner that it does not harm or distort the tape 102 as it is wound on the outer hub 108.

When it is desired to remove the tape 102 from the take-up reel 103, the rotation of shaft 104 is halted and a similar shaft associated with the cassette 101 is rotated in an appropriate direction to remove the tape 102 from the take-up reel 103 and wind it on a hub (not shown) in cassette 101. During the rewind operation, it is conventional to provide a slight drag on the take-up reel in order to provide a slight tension on the tape 102. In a similar manner, during the winding of the tape 102 on the take-up reel 103, a slight drag is applied at the supply reel to maintain a tension in the tape 102. During the return of the tape 102 to the cassette 101, the inner and outer hubs 107 and 108, respectively, are still keyed together by the action of leader hook 105 and more specifically, by the contact between the trailing edge 135 of leader hook 105 and the edge 126 of opening 124. When all of the tape 102 is unwound from the outer hub 108, the rotation of the outer hub will stop and the leader hook 105 will be withdrawn from the opening 124 and a portion of the tape 106 will be unwound from the inner hub 107 while the inner hub continues to rotate in response to the tension applied on tape 102. The rotation of the outer hub 108 is inhibited by the contact of edges 125 and/or 126 of opening 124 with the leader tape 106.

While there has been shown and described what is considered at present to be the preferred embodiment of the invention, modifications thereto will readily occur to those skilled in the related arts. For example, depending upon the orientation of the take-up reel, it may be desirable to provide an upper as well as a lower flange and it would be possible to provide a leader hook which does not necessarily have a depending portion and such change in the leader hook would eliminate the need for the depressed portion 123 of flange 120. It is believed that no further analysis or description of the present invention is required and that the foregoing specification so fully reveals the gist of the present invention that those skilled in the applicable arts can readily adapt it to meet the exigencies of their specific requirements.

What is claimed is:

1. In a tape transport system:
(a) a supply reel and a take-up reel;
(b) first and second leader tapes associated with said supply reel and said take-up reel, respectively;
(c) a leader hook for coupling said first and second leader tapes;
(d) said take-up reel comprising inner and outer concentric hubs;
(e) drive means for rotating said inner hub about its axis;
(f) said inner and outer hubs having a channel and an opening, respectively, are interconnected to produce an aperture means, said leader hook being of a size to lodge between and in contact with said inner and outer hubs in said aperture means in a fixed position relative to said inner hub and essentially inside the circumference of said outer hub when said drive means rotates said inner hub to wind said first leader tape thereon; and
(g) said contact of said leader hook with said hub in said aperture means providing a cooperative relationship for coupling said outer hub to said inner hub for rotating said outer hub with said inner hub in response to the continued rotation of said inner hub after said leader hook is lodged in said aperture means.

2. The combination as set forth in claim 1 and including rewind means for rotating said supply reel in a direction to wind the tape thereon, and wherein said cooperative relationship produced by said leader hook and said aperture means includes means for coupling said inner and outer hubs for coincident rotation thereof when said rewind means operates to wind the tape on said supply reel.

3. The combination as set forth in claim 2 wherein said leader hook includes a dependent portion which is below the lower limit of said leader tapes, and wherein said outer hub has a lower flange including a depressed portion for accommodating the passage of said dependent portion of said leader hook as it is drawn towards or from said aperture means in response to the action of said drive means and said rewind means, respectively.

References Cited

UNITED STATES PATENTS 3,185,401 5/1965 Hardy ............ 242—188

GEORGE F. MAUTZ, Primary Examiner

U.S. Cl. X.R.

242—74